Patented Jan. 12, 1943

2,308,186

UNITED STATES PATENT OFFICE 2,308,186

MANUFACTURE OF RUBBER HYDROCHLORIDE

George R. Lyon, St. Marys, Ohio, assignor to Wingfoot Corporation, Wilmington, Del., a corporation of Delaware No Drawing. Application April 30, 1941, Serial No. 391,215

3 Claims. (Cl. 18—57)

This invention relates to the preparation of films of rubber hydrohalides such as rubber hydrochlorides and rubber hydrobromides, etc. It relates particularly to the heat treatment of a hydrochlorinated rubber cement to produce clear film. The invention will be discussed more particularly in connection with its relation to rubber hydrochloride.

This application is in part a continuation of my application Serial No. 242,564 filed November 26, 1938, which in turn is in part a continuation of my application Serial No. 132,659 filed March 23, 1937.

In the preparation of rubber hydrochloride films it is desirable to dissolve or disperse the rubber in an organic solvent and then hydrochlorinate it and then without separating the solvent subject the dispersion or cement to whatever treatments are necessary to condition the material so that the film can be formed by casting the cement. In Calvert 1,989,632 it is proposed to hydrochlorinate a benzene cement of rubber and then precipitate it to remove impurities and then redissolve it in a suitable solvent for the preparation of film. For solution of the precipitated rubber hydrochloride it is suggested that chloroform be used or that benzene may be employed if the benzene is heated. It was not at first apparent that a solvent such as benzene could be used throughout the process because rubber hydrochloride dissolves in benzene with difficulty. Benzene is here mentioned as typical of those solvents in which rubber hydrochloride is soluble at elevated temperatures but in which rubber hydrochloride gels and forms gelation aggregates at lower temperatures, such as room temperature. Solvents of this kind include benzene, toluene, xylene, 1,2-dichlorethane, sym. dichlorethylene, trichlorethylene, propylene dichloride, chlorobenzene, beta-trichlorethane, etc. These solvents are thus to be distinguished from solvents such as chloroform, sym. tetrachlorethane, methylene dichloride, etc. in which rubber hydrochloride is soluble and remains in a highly dispersed state at room temperature as well as at higher temperatures. In referring to the solubility of rubber hydrochloride I am referring to the solubility of a rubber hydrochloride produced by hydrochlorination of a rubber cement to produce a rubber hydrochloride of about 30% chlorine content which has been aged as described in Calvert Patent No. 2,139,647 to a point satisfactory for the production of a self-sustaining film when cast on a suitable surface.

According to this invention films of high clarity are produced by hydrochlorinating a cement of rubber in benzene or like solvent and then after suitable treatment, as, for example, the removal of the dissolved excess of hydrogen chloride, casting the cement to form a thin film. Films spread from such cements are normally not clear due to the presence of gelation aggregates in the cement. I have found that such aggregates can be broken down simply by heating the cement and keeping it hot, and when so broken down the cement forms a clear film. Without this heating step clear films may be obtained only if lower temperature solvents such as chloroform are employed. The heating may be advantageously combined with the neutralization of excess rubber hydrochloride as described in my application Serial No. 132,659. Soda ash or sodium sulfite is preferred for such neutralization. The neutralization may follow a ripening process such as that described in Calvert Patent No. 2,139,647.

In order to break down the gelation aggregates I prefer to heat the hydrochlorinated benzene cement to a temperature of about 55 to 65° C. Higher temperatures may be employed but generally temperatures no higher than 65° C. will be employed. The heating process homogenizes the rubber hydrochloride by dissolving or peptizing the gelation aggregates and is a most essential factor for the production of films of high clarity when solvents of the benzene type are employed.

It is desirable to neutralize the dissolved excess of hydrogen chloride by adding a basic material to the heated cement or by adding the basic material just prior to heating. The cement is then preferably filtered to remove the excess of the neutralizing agent while still at this higher temperature. In this way the advantages of hot neutralization are combined with the heating of the cement to produce high clarity and filtration at elevated temperatures which is more rapid and efficient than filtration at a lower temperature. The cement thus obtained is preferably cast into film form while still hot although it may be cooled below the temperature of aggregation and spread at this lower temperature before any substantial formation of aggregates occurs.

The invention will be illustrated by reciting the steps of a process in which a benzene cement is employed and both neutralization and filtration are carried out at a high temperature and a film of about .001 inch thickness is then produced from the cement while still hot.

*Example.*—A batch consisting of 250 pounds of rubber milled to a plasticity of 220 (Williams Plastometer) is made into a cement in 3321 pounds of benzol (a 7% cement). This cement is "gassed" with 157.1 pounds of dry HCl at a temperature of 15–20° C. while being agitated. The resulting cement is allowed to age or ripen by standing for eight hours at not over 25° C. (gradually approaching room temperature) and is then neutralized by adding with agitation 68 pounds soda ash (light). Two hundred fifty gallons of benzol is then added. The soda ash used is of the easily filterable type. The cement mixture is then gradually heated to 60° C. during a period of 10.5 hours. An additional 10 pounds soda ash is added and heating at 60° C. is continued for two hours. This prolonged heating at 60° C. homogenizes the cement. The cement mixture is then cooled to 55° C. and filtered. The filtered cement may now be compounded with plasticizers, pigments, etc., and is ready for immediate spreading into pellicles.

It may be advantageous to add a stabilizer such as hexamethylene tetramine or other stabilizer such as any of those discussed in Calvert 1,989,632. This may advantageously be added to the cement after neutralization and either before or after filtration. The cement may be colored, as for example by the addition of dyestuffs or pigments, after neutralization and filtration. Plasticizers such as butyl stearate may be added. Other compounding ingredients may be added.

Using other solvents of the benzene type the temperatures to which the cements must be heated to break down gelation aggregates may vary slightly, but they still fall within the range already specified. The temperature to which the cement must be heated to break down the gelation aggregates is referred to herein as the temperature of disaggregation.

What I claim is:

1. In a process of producing clear rubber hydrochloride film from a non-homogeneous cement of rubber hydrochloride dissolved in a solvent of the benzene type, the steps which comprise heating the cement to a temperature sufficient, and for a time sufficient to homogenize it and casting film from the homogenized cement.

2. In a process of producing clear rubber hydrochloride film from a non-homogeneous hydrochlorinated benzene cement of rubber, which cement has been ripened by standing, the steps which comprise homogenizing the cement by heating it to a temperature of at least 55° C. until it is homogenized and casting film from the homogenized cement.

3. In a process of producing clear rubber hydrochloride film from a non-homogeneous benzene cement of rubber hydrochloride, the steps which comprise heating the cement at a temperature of about 55 to 65° C. until it is homogenized and casting the film from the homogenized cement.

GEORGE R. LYON.